(12) United States Patent
Sugahara et al.

(10) Patent No.: US 7,295,258 B2
(45) Date of Patent: Nov. 13, 2007

(54) DISPLAY DEVICE AND LIQUID CRYSTAL DISPLAY DEVICE HAVING A BACK FRAME CONFIGURATION THAT INCREASES TORSIONAL STRENGTH

(75) Inventors: Tatsuo Sugahara, Mie (JP); Takafumi Hara, Kyoto (JP); Fujio Ueda, Mie (JP); Tatsuya Kudari, Mie (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 151 days.

(21) Appl. No.: 10/936,531

(22) Filed: Sep. 9, 2004

(65) Prior Publication Data

US 2005/0117086 A1 Jun. 2, 2005

(30) Foreign Application Priority Data

Sep. 10, 2003 (JP) ............................. 2003-318696
Aug. 19, 2004 (JP) ............................. 2004-239887

(51) Int. Cl.
*G02F 1/1333* (2006.01)
*G06K 1/16* (2006.01)

(52) U.S. Cl. ........................................ 349/58; 361/681
(58) Field of Classification Search .................. 349/58; 361/681
See application file for complete search history.

(56) References Cited

U.S. PATENT DOCUMENTS

| | | | | |
|---|---|---|---|---|
| 5,748,269 A | * | 5/1998 | Harris et al. ................... | 349/58 |
| 5,986,726 A | * | 11/1999 | Murai ........................... | 349/59 |
| 6,445,373 B1 | | 9/2002 | Yamamoto | |
| 6,466,283 B1 | * | 10/2002 | Peng ............................. | 349/58 |
| 6,504,587 B1 | * | 1/2003 | Morishita et al. ............. | 349/58 |
| 6,639,635 B2 | * | 10/2003 | Wang ........................... | 349/58 |
| 6,667,780 B2 | * | 12/2003 | Cho ............................. | 349/58 |
| 6,762,807 B2 | * | 7/2004 | Lee et al. ..................... | 349/58 |
| 6,801,195 B2 | * | 10/2004 | Yoshida ....................... | 345/204 |
| 6,801,268 B2 | | 10/2004 | Huang et al. | |

FOREIGN PATENT DOCUMENTS

| | | |
|---|---|---|
| JP | 58-081572 | 6/1983 |
| JP | 04-056822 | 2/1992 |
| JP | 09-114393 | 5/1997 |
| JP | 09-269480 | 10/1997 |
| JP | 11-146305 | 5/1999 |
| JP | 2000-75273 A | 3/2000 |
| JP | 2000-092415 | 3/2000 |
| JP | 2000-258754 | 9/2000 |
| JP | 2001-083887 | 3/2001 |
| JP | 2001-209327 A | 8/2001 |
| JP | 2001-249619 A | 9/2001 |
| JP | 2002-90736 A | 3/2002 |
| JP | 2002-215051 | 7/2002 |
| JP | 2003-035899 | 2/2003 |
| JP | 2003-050549 | 2/2003 |
| JP | 2003-150076 | 5/2003 |

\* cited by examiner

*Primary Examiner*—Mike Qi
(74) *Attorney, Agent, or Firm*—Birch, Stewart, Kolasch & Birch, LLP (57) ABSTRACT

In a display device in which a display panel is supported from the back by a back frame, the back frame is composed of a pair of long side portions and a pair of short side portions each having an angular structure in section. Whereby, torsional strength is increased while suppressing increase in weight. This leads to increase in torsional strength while suppressing increase in weight even in a large-sized display screen.

17 Claims, 9 Drawing Sheets

DISPLAY DEVICE AND LIQUID CRYSTAL DISPLAY DEVICE HAVING A BACK FRAME CONFIGURATION THAT INCREASES TORSIONAL STRENGTH

CROSS REFERENCE TO RELATED APPLICATIONS

This Non-provisional application claims priority under 35 U.S.C. § 119(a) on Patent Applications No. 2003-318696 filed in Japan on Sep. 10, 2003 and No. 2004-239887 filed in Japan on Aug. 19, 2004, the entire contents of which are hereby incorporated by reference.

BACKGROUND ART

The present invention relates to a display device such as a liquid crystal display device in which a display panel such as a liquid crystal display panel for displaying visual information such as characters and images is supported by a back frame from the back, and particularly relates to an improvement of the back frame.

A conventional liquid crystal display device in which a liquid crystal display panel is supported by a back frame from the back, as disclosed in Japanese Patent Application Laid Open Publication No. 2000-75273A as Patent Reference 1, for example, includes a box-shaped resin frame body having a bottom wall and a peripheral wall as the back frame, thereby ensuring the torsional strength.

Further, Japanese Patent Application Laid Open Publication No. 2001-209327A as Patent Reference 2 and Japanese Patent Application Laid Open Publication No. 2002-90736A as Patent Reference 3 disclose that a reflection plate of a backlight section is used as a back frame, with no use of an exclusive back frame, thereby reducing the weight.

On the other hand, upsizing of the display screens in liquid crystal display devices used in liquid crystal television sets is being promoted recently, and accordingly, it is demanded to increase the torsional strength and to suppress increase in weight.

However, in the above conventional liquid crystal display devices, the weight is increased inevitably in Patent Reference 1, and it is difficult to attain sufficient torsional strength with no exclusive back frame in Patent Reference 2 and Patent Reference 3.

SUMMARY OF THE INVENTION

The present invention has been made in view of the above matters, and has its main object of increasing the torsional strength while suppressing the increase in weight, in a display device such as a liquid crystal display device in which a display panel such as a liquid crystal display panel for displaying visual information such as characters and images is supported by a back frame from the back, by improving the back frame, thereby coping with upsizing of the display screen without weight reduction sacrificed.

To attain the above object, in the present invention, long side portions and short side portions which form a substantially rectangular shaped back frame are in angular structures in section, thereby suppressing the increase in weight and increasing the torsional strength.

Specifically, a display device of the present invention is set, as a premise, to include a substantially rectangular shaped display panel for indicating visual information and a substantially rectangular shaped back frame arranged at the back of the display panel and supporting the display panel.

Wherein, the back frame includes a pair of long side portions extending in the long side direction and arranged in the short side direction, and a pair of short side portions which extend respectively in the short side direction at the end portions in the long side direction of the long side portions between the pair of the long side portions and of which respective end portions are connected to the respective end portions of the long side portions. Each long side portion has a angular structure in section in which several parts are bent in the short side direction, and each short side portion has an angular structure in section in which several parts are bent in the long side direction. Herein, the "angular structure in section" means a structure in which several parts are bent in section to form angles (angle in the range between 0 degree and 360 degrees except 180 degrees). The formation of an arc and the size of the arc in the section at the bent parts are designed appropriately, and no limitation is imposed particularly.

It is preferable in the above construction that each long side portion is substantially in a U shape in section.

Further, a reinforcing bead may be formed at the long side portions so as to extend in the long side direction or may be formed at the short side portions so as to extend in the short side direction. It is also possible that the back frame composed of the long side portions and the short side portions may be formed by connecting long side members and short side members with each other, which are different members from each other, by connection mans such as welding.

Furthermore, it is preferable that at least one beam portion in the angular structure in section is arranged between the pair of the short side portions and the respective end portions thereof are connected with the respective long side portions. In this case, it may be possible that a reinforcing bead is formed in the beam portion so as to extend in the short side direction. It is also possible that the beam portion is formed of separate member as a beam member and the beam member is connected with the long side portions or the long side members by means of connection means such as welding.

Moreover, in the case where at least one frame in a L shape in section including a front face portion arranged at the peripheral portion of the display panel so as to overlap with the display panel in the panel thickness direction and a side face portion extending from the outer periphery of the front face portion toward the back frame may be provided, in addition to the back frame, for increasing the torsional strength and the aforementioned at least one frame is formed of a plurality of divisional members connected with one another, it is preferable that the connection between the end portions of the divisional members is carried out in the front face portion and between the end portions of the divisional members in the side face portion. It is more preferable that the connection is carried out by welding. It is noted that as the aforementioned at least one frame, there may be two frames of: a rear frame of which front face portion is located at the back frame side of the display panel; and a front frame of which front face portion is located at the side opposite the back frame side of the display panel, but only one of them may be provided or both of them may be provided.

The display device having the above construction can be used as a liquid crystal display device in which light is emitted from a backlight section to a liquid crystal display panel in which a pair of transparent substrates and a liquid crystal layer disposed therebetween are arranged.

DETAILED DESCRIPTION OF THE INVENTION

An embodiment of the present invention will be described below with reference to drawings.

Figure 2:
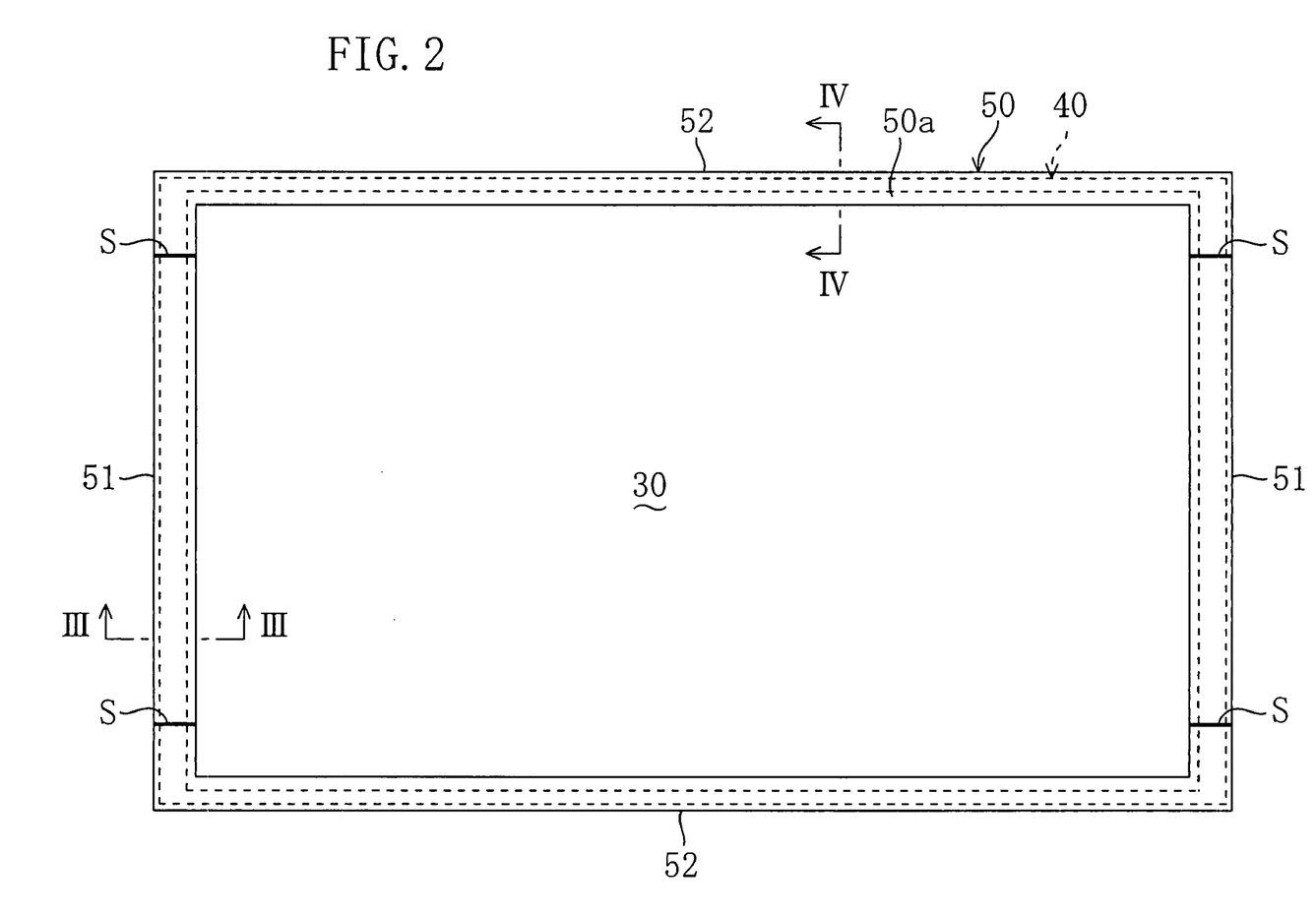
FIG. 2 is a front view showing a whole construction of the liquid crystal display device.
Figure 3:
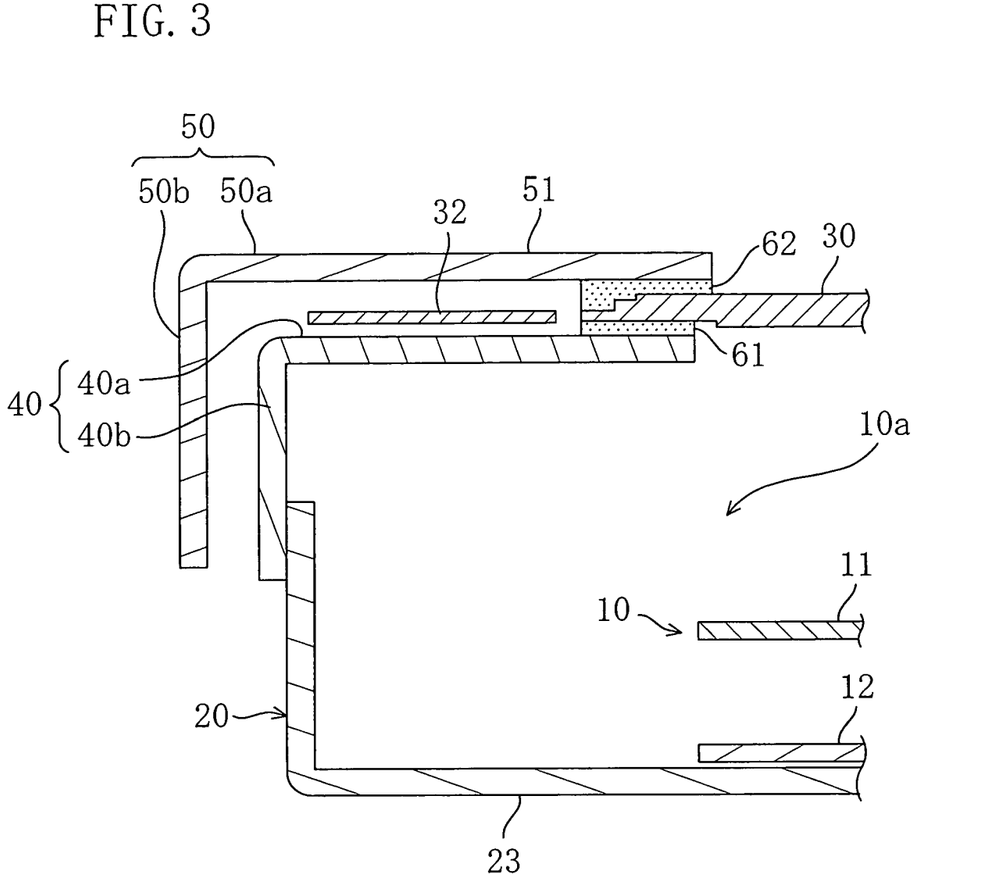
FIG. 3 is an enlarged section taken along the line III-III in FIG. 2.
Figure 4:
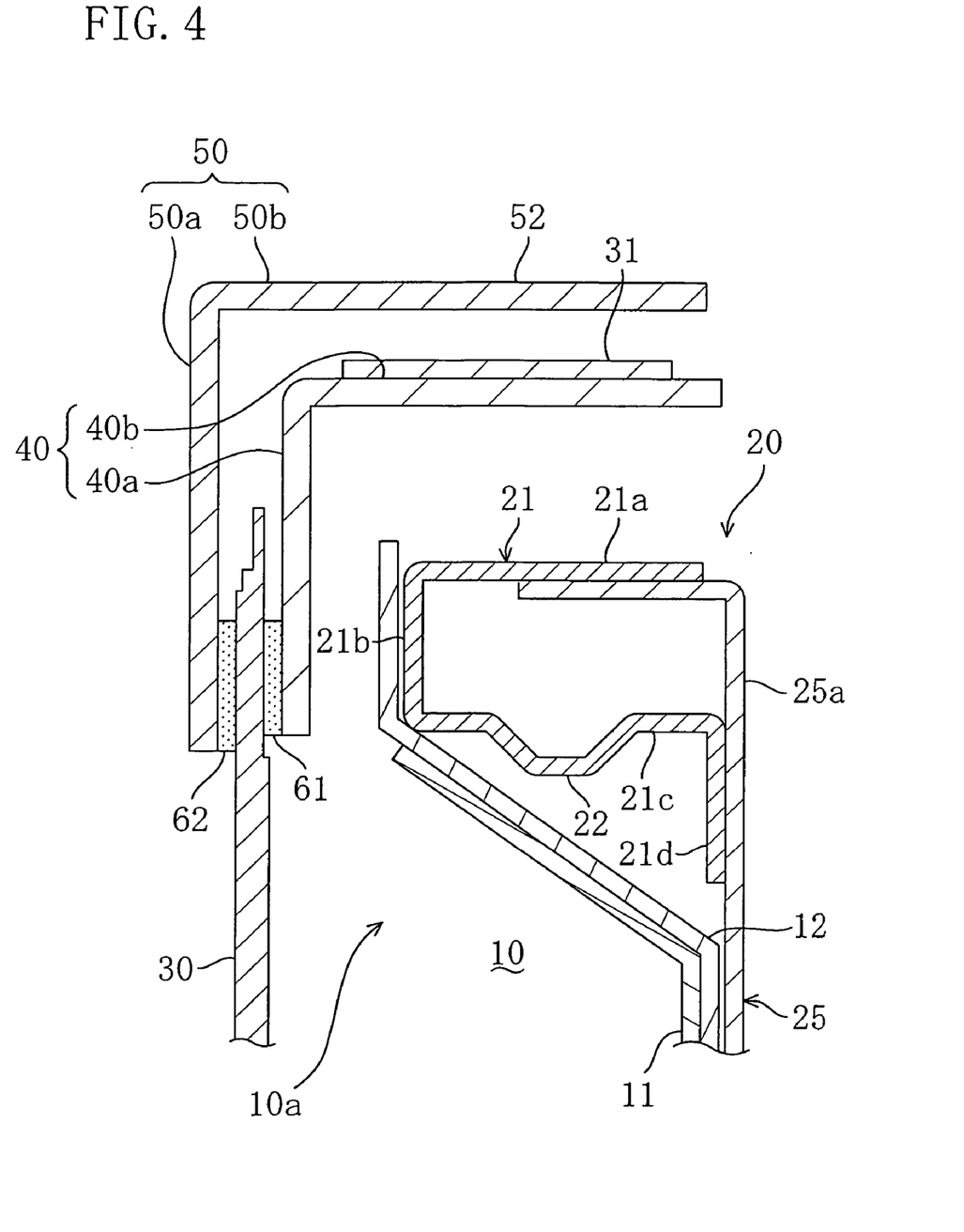
FIG. 4 is an enlarged section taken along the line IV-IV in FIG. 2.

FIG. 2 of a front view and FIG. 3 and FIG. 4 of enlarged sections schematically show a whole construction of a liquid crystal display device according to the embodiment of the present invention, wherein the liquid crystal display device is used as a display device for a 37-inch wide liquid crystal television set of which height to width ratio of the display screen is 9:16.

As shown in FIG. 3 and FIG. 4, the liquid crystal display device includes: a backlight section 10 having a light emitting face 10a; a back frame 20 that holds the backlight section 10 from the side opposite the light emitting face 10a side (lower side in FIG. 3 and right side in FIG. 4); a liquid crystal display panel 30 as a display panel arranged so as to cover the light emitting face 10a of the backlight section 10; a mounting frame 40 as a rear frame for fixing the liquid crystal display panel 30 to the back frame 20; and a bezel (frame) 50 as a front frame for holding, with the use of the mounting frame 40, the peripheral portion of the liquid crystal display panel 30 in a direction of the thickness of the liquid crystal display panel 30 (the vertical direction in FIG. 3 and the transverse direction in FIG. 4: hereinafter referred to simply as "panel thickness direction"). Wherein, the light emitting face 10a of the backlight section 10, the back frame 20, the liquid crystal display panel 30, the mounting frame 40 and the bezel 50 are in rectangular shapes each having long sides in the transverse direction in FIG. 1 and short sides in the vertical direction in FIG. 1. It is noted that the back frame 20 is set, as one example, to have the length L in the long side direction of 880 mm, the width W in the short side direction of 505 mm and the height H in the panel thickness direction of 11 mm in the present embodiment.

In the backlight section 10 of direct backlight type, a plurality of line light sources such as cold cathode tubes (not shown) are extended in the long side direction (the transverse direction in FIG. 2) and arranged along the short side direction (the vertical direction in FIG. 2). On the side opposite the liquid crystal display panel 30 side of the line light source (lower side in FIG. 3 and right side in FIG. 4: hereinafter referred to as "panel opposite side"), a reflection sheet 11 for reflecting light of the line light sources is arranged so that the light emitting face 10a of the backlight section 10 is formed on the liquid crystal display panel 30 side (upper side in FIG. 3 and left side in FIG. 4: hereinafter referred to simply as "panel side"). A holding plate 12 for holding the reflection sheet 11 is arranged on the panel opposite side of the reflection sheet 11. It is noted that the backlight section 10 may be of edge lighting type.

Figure 5:
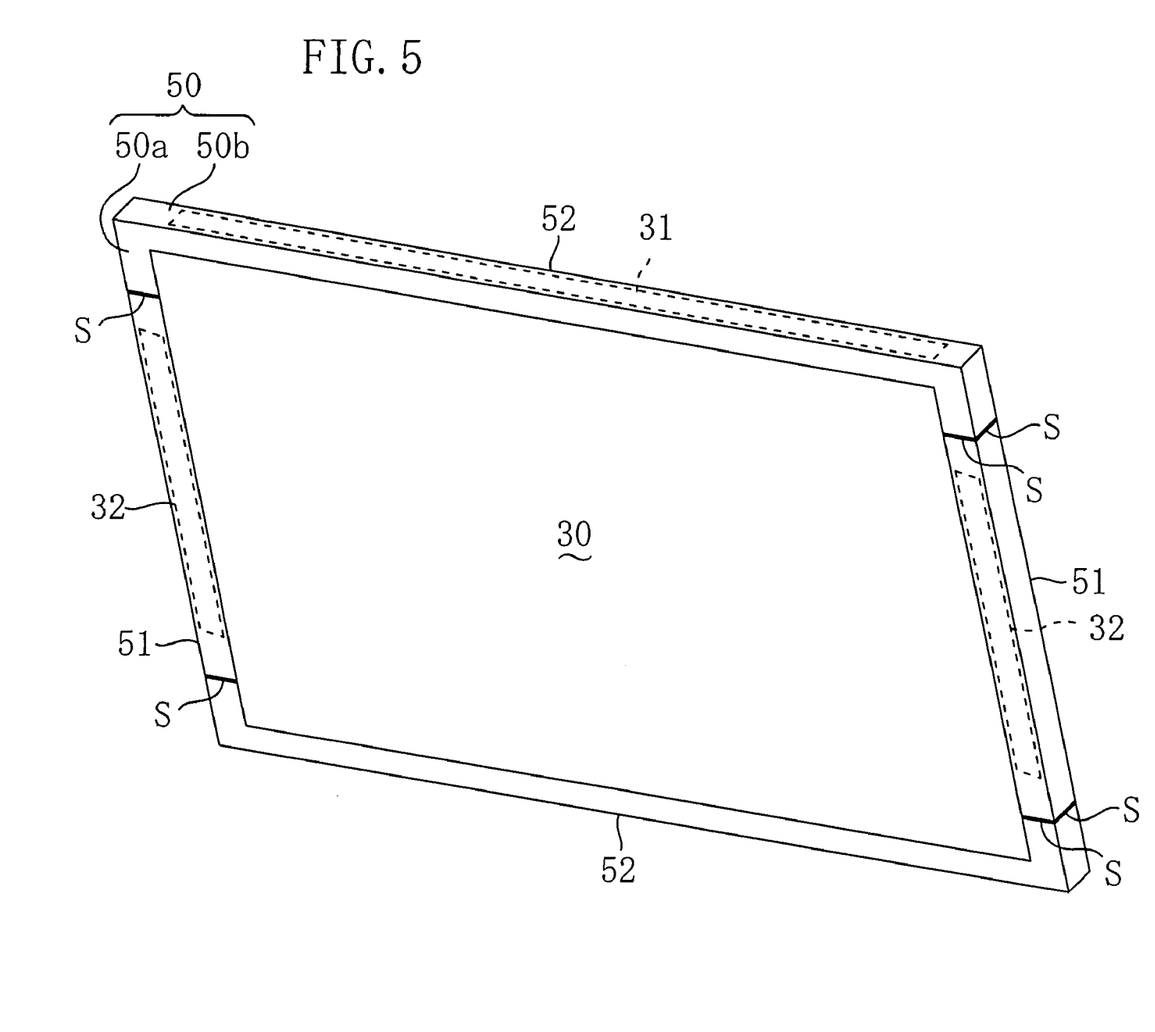
FIG. 5 is a perspective view showing an arrangement of a data driver circuit and scan driver circuits for a liquid crystal display panel.

The liquid crystal display panel 30 is, for example (though not shown), of active matrix type composed of a TFT substrate as a transparent substrate in which a pixel electrode portion and a TFT (Thin Film Transistor) are provided for each pixel, a CF substrate as a transparent substrate in which a counter electrode portion and a color filter layer are provided, and a liquid crystal layer interposed between the substrates, and polarizing plates are attached respectively to the surfaces opposite the respective surfaces on the liquid crystal layer side of the electrode substrates. In the liquid crystal display panel 30, data lines for transmitting a data signal to the source electrode of each TFT are extended in the short side direction and arranged along the long side direction, and scan lines for transmitting a scan signal to the gate electrode of each TFT are extended in the long side direction and arranged along the short side direction. Correspondingly, as schematically shown in FIG. 5 of a perspective view, a data driver circuit 31 for outputting the data signal to each TFT is provided so as to extend substantially over the entire range on one of the long sides of the liquid crystal display panel 30, and a scan driver circuit 32 for outputting the scan signal to each TFT is provided collectively at each substantial center on the short sides of the liquid crystal display panel 30. These driver circuits 31, 32 are arranged between the mounting frame 40 and the bezel 50.

The mounting frame 40 is substantially in an L shape in section including a front face portion 40a that covers the peripheral portion of the light emitting face 10a of the backlight section 10 and a side face portion 40b extending from the outer periphery of the front face portion 40a toward the back frame 20 (downward in FIG. 3 and FIG. 4). The front face portion 40a is located on the back frame 20 side of the peripheral portion of the liquid crystal display panel 30, and the side face portion 40b is fixed to the back frame 20. Further, the mounting frame 40 supports the peripheral portion of the liquid crystal display panel 30 from the back frame 20 side with intervening a cushion material 61 disposed at the liquid crystal display panel 30 side of the front face portion 40a (upper side in catch drawing FIG. 3 and left side in FIG. 4).

Figure 6:
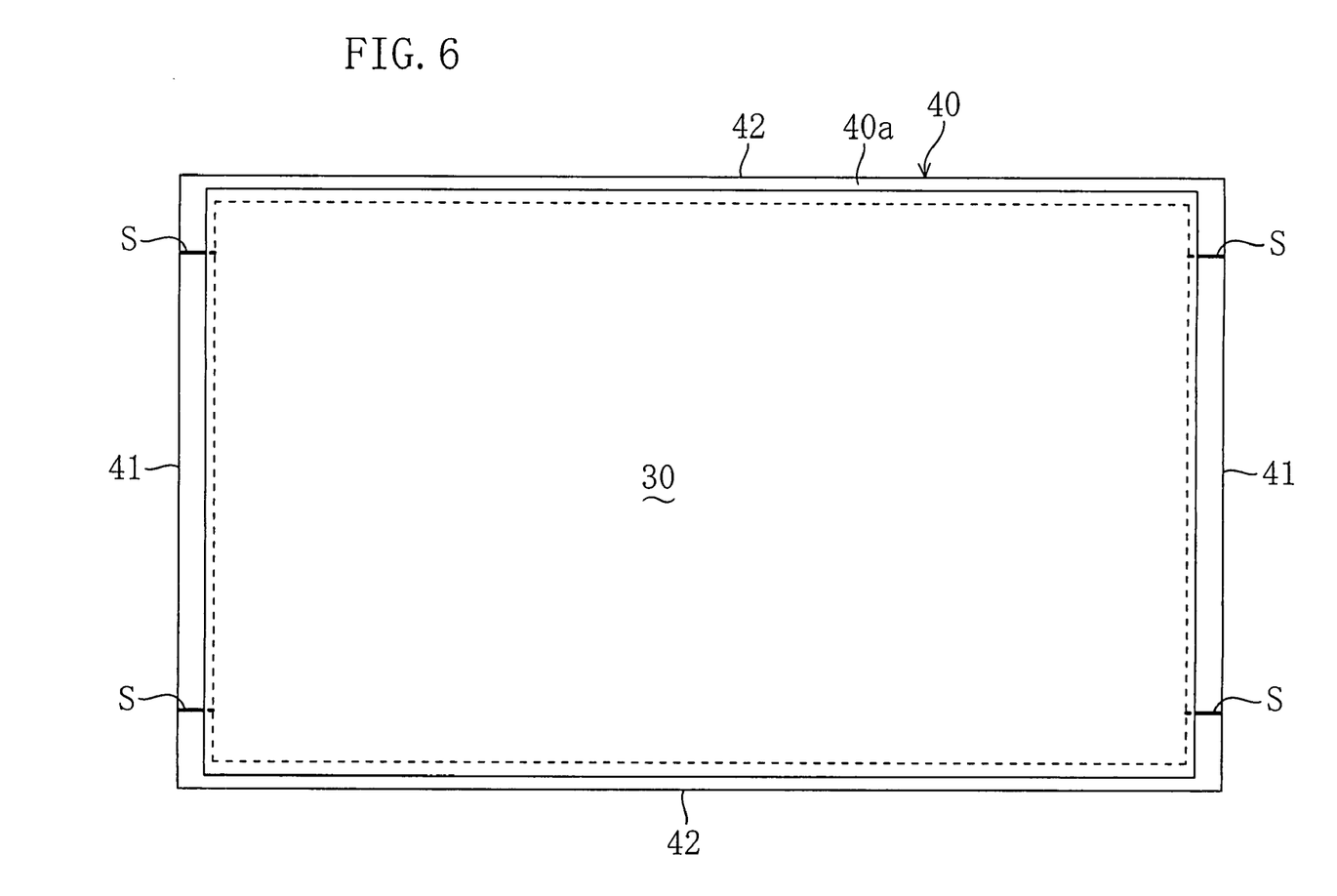
FIG. 6 is a front view showing the liquid crystal display device of which bezel is taken away.

Furthermore, the mounting frame 40 is, as schematically shown FIG. 6, composed of two frame straight members 41 each forming a straight portion except each end portion of the short side portions and two frame U-shaped members 42 each formed of the long side portion and the end portions of the short side portions at respective end portions of the long side portion, wherein the respective end portions of the frame straight members 41 are connected with the respective end portions of the frame U-shaped members 42. Each of the frame straight members 41 and the frame U-shaped members 42 are made by bending a plate piece cut out into a predetermined shape from a metal plate (e.g., an iron plate, aluminum alloy plate or the like). Further, the respective end portions of the frame straight members 41 and the frame U-shaped members 42 are connected by welding with each other in the entire range of each slit between the end portions in the outer face side of the front face portion 40a and in the entire range of each slit between the end portions in the outer face side of the side face portion 40b. Wherein, S indicates the welded portion in FIG. 6.

Similar to the mounting frame 40, the bezel 50 is substantially in an L shape in section including a front face portion 50a that covers the peripheral portion of the light emitting face 10a of the backlight section 10 and a side face portion 50b extending from the outer periphery of the front face portion 50a toward the backlight section 10, and is fixed to the back frame 20 at the side face portion 50b. Wherein, the front face portion 50a is arranged at the side opposite the back frame 20 side of the peripheral portion of the liquid crystal display panel 30 (upper side in FIG. 3 and lower side in FIG. 4), so that the bezel 50 holds, with the use of the front face portion 40a of the mounting frame 40, the peripheral portion of the liquid crystal display panel 30 with intervening a cushion material 53 disposed at the liquid crystal display panel 30 side of the front face portion 50a (upper side in FIG. 3 and lower side in FIG. 4).

Furthermore, the bezel 50 is composed of two bezel straight members 51 each forming the straight portion except each end portion of the short side portions and two bezel U-shaped members 52 each formed of an integration of the long side portion and the end portions of the short side portions at each end portion of the long side portions, wherein the respective end portions of the members are connected with each other (see FIG. 2 and FIG. 5), and each of the bezel straight members 51 and the bezel U-shaped members 52 are formed by bending a plate piece cut out from a metal plate (e.g., iron plate or the like). In the case where either one of the mounting frame 40 and the bezel 50 is formed of a single piece cut out into a predetermined shape from a metal plate, waste part after cutting out of the metal plate is increased in association with upsizing of the display screen of a liquid crystal display device. While, in the present embodiment, both the mounting frame 30 and the bezel 40 are prepared by connecting the frame straight members 41 and the frame U-shaped members 42 with each other and connecting the bezel straight members 51 and the bezel U-shaped members 52 each other, each of which is obtained by bending a plate piece cut out from a metal plate, and accordingly, such waste part can be minimized. Further, the respective end portions of the bezel straight members 51 and the bezel U-shaped members 52 are connected by welding with each other in the entire range of each slit between the end portions in the outer face side of the front face portion 50a and in the entire range of each slit between the end portions in the outer face side of the side face portion 50b. Wherein, S indicates the welded portion in FIG. 2 and FIG. 5.

Figure 1:
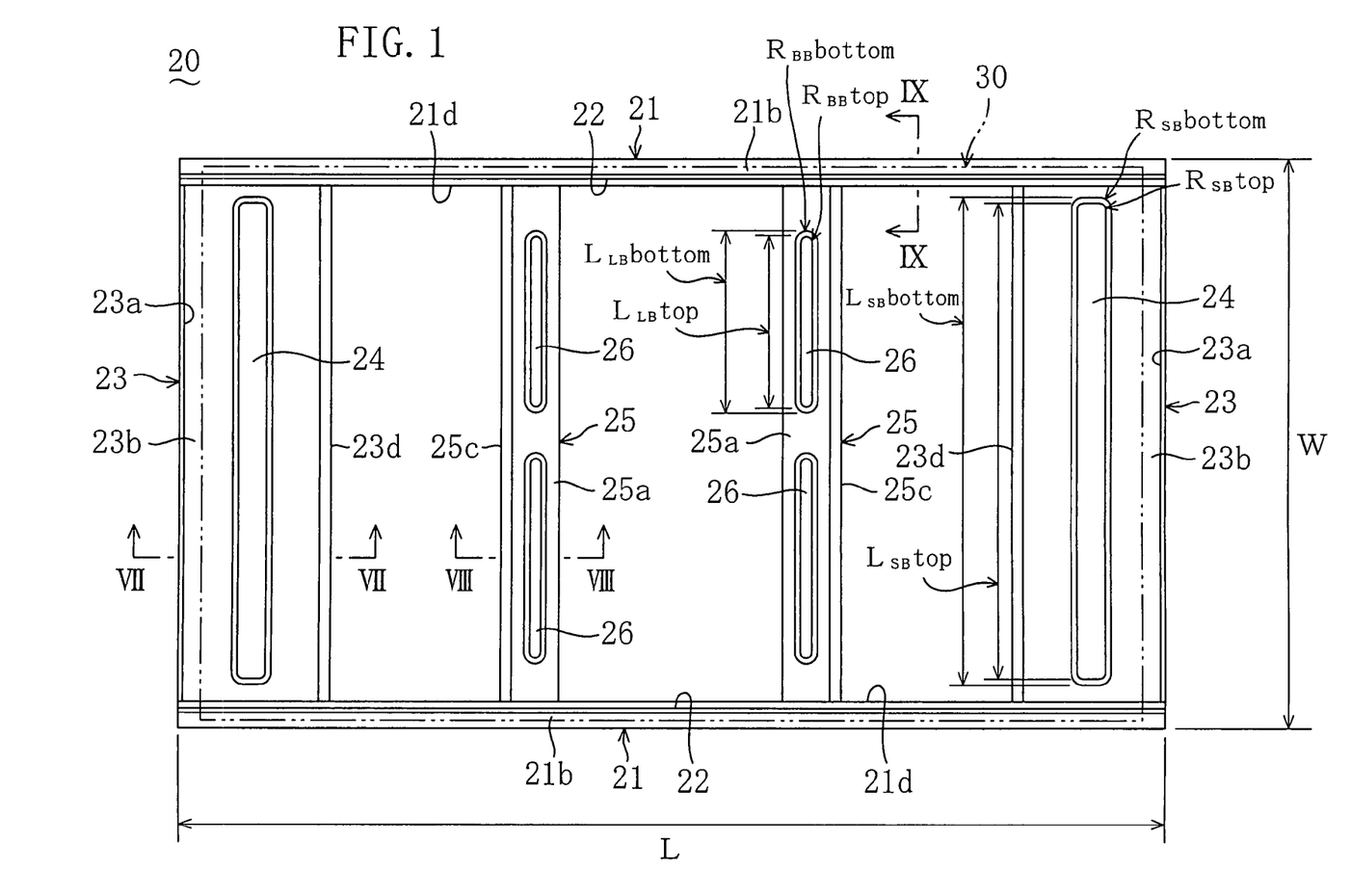
FIG. 1 is a front view showing a back frame used in a liquid crystal display device according to an embodiment of the present invention.

In the present embodiment, as shown in FIG. 1 of a front view, the back frame 20 is composed of: a pair of long side members 21 extending in the long side direction (the transverse direction in FIG. 1) and arranged along the short side direction (the vertical direction in FIG. 1); a pair of short side members 23 extending in the short side direction at each end portion in the long side direction of the long side portions 21 between the pair of long members 21 so as to connect at the respective end portions thereof with the respective end portions of the long side members 21; and two beam members 25 extending in the short side direction between the pair of short side members 23 so as to connect at the end portions thereof with the pair of the long side members 21.

Figure 7:
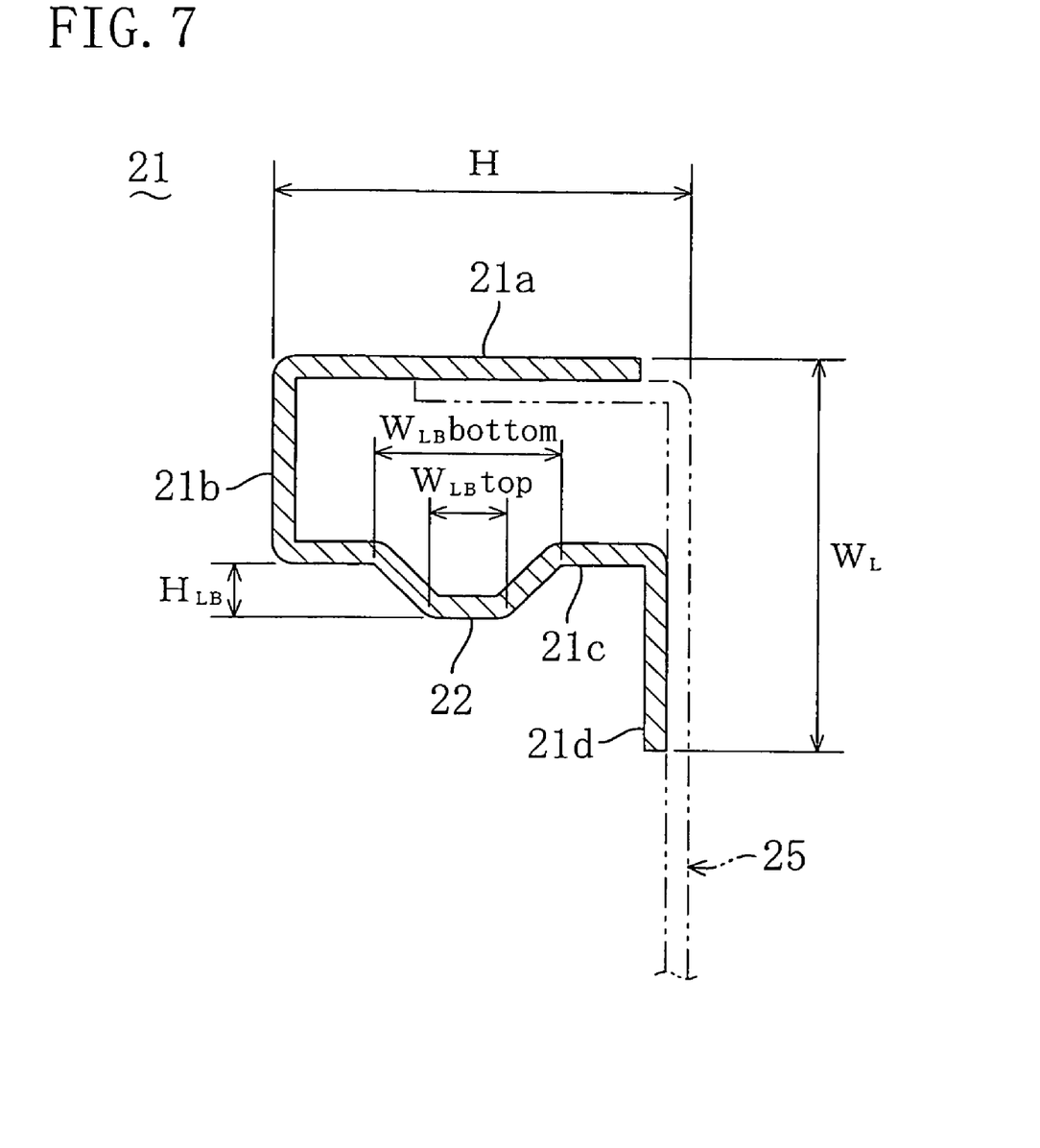
FIG. 7 is an enlarged section taken along the line VII-VII in FIG. 1, showing the section of a long side member of the back frame.

Each long side member 21 is in an angular structure of substantially a U shape in section, as shown in FIG. 7 of the enlarged section. Specifically, each long side member 21 is composed of: an outer face portion 21a extending in the panel thickness direction (the transverse direction in FIG. 7) to form an outer peripheral wall of the long side of the back frame 20; an upper face portion 21b (downward in FIG. 7) extending inward from the panel side (left side in FIG. 7) end of the outer face portion 21a; an inner face portion 21c extending from the inside end of the upper face portion 21b toward the panel opposite side (right side in FIG. 7); and a bottom face portion 21d extending inward from the end of the inner face portion 21c. In short, each long side member 21 is bent at a right angle at three parts between the outer face portion 21a and the upper face portion 21b, between the upper face portion 21b and the inner face portion 21c and between the inner face portion 21c and the bottom face portion 21d. The long side members 21 are prepared by bending a comparatively thick (e.g., about 2.0 mm) metal plate (e.g., an iron plate, an aluminum alloy plate or the like). Wherein, the long side members 21 have a width $W_L$ of 13.0 mm for one example in the present embodiment.

A reinforcing bead 22 projecting, like a single strip, inward of the back frame 20 (downward in FIG. 7) is formed so as to extend in the long side direction in the inner face portion 21c of each long side member 21. Wherein, the reinforcing bead 22 has a top face having a width $W_{LB}$top of 3.0 mm, a bottom section having a width $W_{LB}$bottom of 9.0 mm, and a height $H_{LB}$ from the bottom to the top of 3.0 mm in the present embodiment as one example. Herein, the top face is located at the lower side in FIG. 7 and the bottom side is located at the upper side in FIG. 7.

Figure 8:
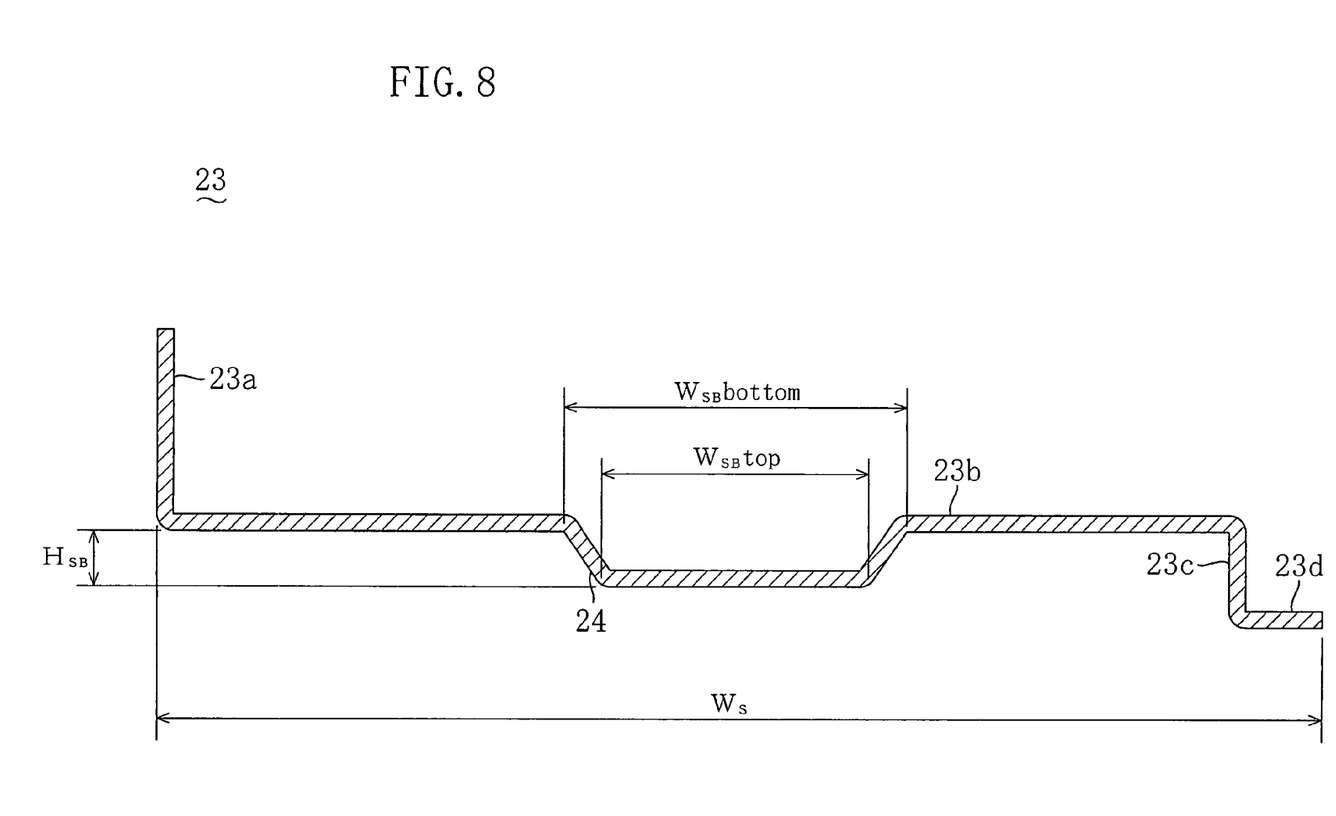
FIG. 8 is an enlarged section taken along the line VIII-VIII in FIG. 1, showing the section of a short side member of the back frame.

Each short side member 23 is in an angular structure in which three parts in section are bent at a right angle, as shown in FIG. 8 of the enlarged section. Specifically, each short side member 23 is composed of: an outer face portion 23a extending in the panel thickness direction (the vertical direction in FIG. 8) to form an outer peripheral wall of the short side of the back frame 20; a bottom face portion 23b extending inward from the panel opposite side (lower side in FIG. 8) end of the outer face portion 23a; a protruding portion 23c protruding from the inside end of the bottom face portion 23b toward the panel opposite side; and a flange portion 23d extending inward from the end at the panel opposite side of the protruding portion 23c. The short side members 23 are prepared, for example, from a metal plate (e.g., an iron plate, an aluminum alloy plate or the like) having substantially the same thickness as that of the long side members 21 (e.g., about 2.0 mm). It is preferable that an iron plate is used as the metal plate material in the case where high strength is required in a comparatively large-sized liquid crystal display device (37 inches) and an aluminum alloy plate is used as the metal plate material in the case where weight reduction is required in a comparatively small-sized liquid crystal display device (20 inches). In the present embodiment, the short side member 23 has a width $W_S$ of 70.0 mm as one example.

In the bottom face portion 23b of each short side member 23, a reinforcing bead 24 protruding, like a single strip, toward the panel opposite side is formed so as to extend in the short side direction. The top face and the bottom section of the reinforcing bead 24 are substantially in rectangular shapes in sections, wherein the sizes of the respective portions are so set that the top face length $L_{SB}$top is 206.0 mm, the bottom section length $L_{SB}$bottom is 210.5 mm, the top face width $W_{SB}$top is 25.0 mm, the bottom section width $W_{SB}$bottom is 34.0 mm and the height $H_{SB}$ is 5.0 mm, as one example in the present embodiment. Herein, the top face is located on the lower side in FIG. 8 and the bottom section is located on the upper side in FIG. 8. Referring to the radius of curvature of each of the four corners of the top face and the bottom section in section, the radius of curvature $R_{SB}$top of the corners of the top face is set to be 1.8 mm and the radius of curvature $R_{SB}$bottom of the corners of the bottom section is set to be 4.0 mm, as one example.

Figure 9:
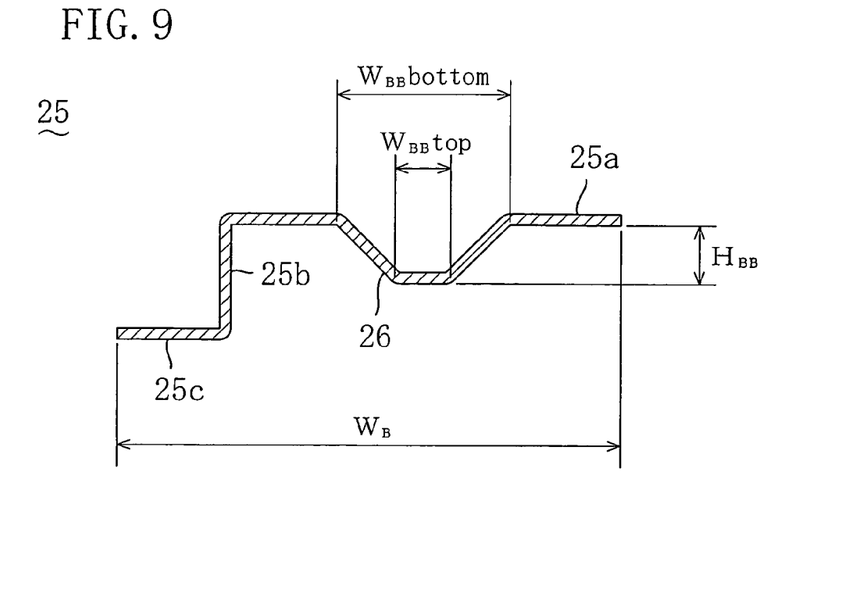
FIG. 9 is an enlarged section taken along the line IX-IX in FIG. 1, showing the section of a beam member of the back frame.

Each beam member 25 is, as shown in FIG. 9 of the enlarged section, in an angular structure in which two parts in section are bent at a right angle. Specifically, each beam member 25 is composed of: a bottom face portion 25*a* arranged in the panel thickness direction, similar to the bottom face portion 23*b* of each short side member 23, and extending in the long side direction; a protruding portion 25*b* extending from the inside end of the bottom face portion 25*a* toward the panel opposite side; and a flange portion 25*c* extending further inward from the end at the panel opposite side of the protruding portion 25*b*. The beam members 25 are prepared by bending a comparatively thin (e.g., about 1.2 mm) metal panel (e.g., an iron plate, aluminum alloy plate or the like). Wherein, the material of the metal plate of the beam members 25 may be the same as that of the long side members 21 and the short side members 23 or may be different therefrom. Also, the width $W_B$ of the beam members 25 is set to be 25.0 mm as one example in the present embodiment.

In the bottom face portion 25*a* of each beam member 25, two reinforcing beads 26 protruding, like two strips, toward the panel opposite side and extending in the short side direction is formed so as to be arranged side by side in the short side direction. Each reinforcing bead 26 has a top face and a bottom section of oval forms and the sizes are set so that the top face length $L_{BB}$top is 78.5 mm, the bottom section length $L_{BB}$bottom is 83.5 mm, the top face width $W_{BB}$top is 7.0 mm, the bottom section width $W_{BB}$bottom is 17.0 mm and the height $H_{BB}$ is 5.0 mm as one example in the present embodiment. Herein, the top face is located at the lower side in FIG. 9 and the bottom section is located at the upper side in FIG. 9. Further, as one example of the radius of curvature (see FIG. 1) of each end portion of the top face and the bottom section in section, the radius of curvature $R_{BB}$top of the top face is set to be 1.5 mm and the radius of curvature $R_{BB}$bottom of the bottom section is set to be 4.0 mm.

In other words, the long side portions, the short side portions and the beam portions of the back frame 20 in the present embodiment are respectively composed of separate members of the long side members 21; the short side members 23; and the beam members 25, whereby the materials of the respective members can be changed according to required strength and properties.

According the present embodiment, the liquid crystal display device includes: the backlight section 10 having the light emitting face 10*a;* the back frame 20 that holds the backlight section 10 from the side opposite the light emitting face 10*a;* the liquid crystal display panel 30 arranged so as to cover the light emitting face 10*a* of the backlight section 10 and capable of changing the transmittance of light from the backlight section 10 in each pixel; the mounting frame 40 which includes the front face portion 40*a* located on the back frame 20 side of the peripheral portion of the liquid crystal display panel 30 and the side face portion 40*b* extending from the outer periphery of the front face portion 40*a* toward the back frame 20 and which is arranged along the peripheral portion of the liquid crystal display panel 30; and the bezel 50 which includes the front face portion 50*a* located on the side opposite the back frame 20 side of the peripheral portion of the liquid crystal display panel 30 and the side face portion 50*b* extending from the outer periphery of the front face portion 50*a* toward the back frame 20 and which is arranged along the peripheral portion of the liquid crystal display panel 30, wherein the back frame 20 is composed of the pair of long side members 21 and a pair of short side members 23 each having the angular structure in section and being connected with each other by welding. Hence, higher torsional strength can be exhibited compared with the case where the entire back face of the liquid crystal display panel 30 is entirely flat. Further, a portion surrounded by the long side members 21 and the short side members 23 can be opened, with a result of weight reduction by the weight of the opened portion. Thus, the torsional strength can be increased while suppressing increase in weight, which would be accompanied by upsizing of a liquid crystal display device. In addition, the formation of the opening portion improves a heat release characteristic of the backlight section 10.

The two beam members 25 are arranged between the long side members 21, in addition to the long side members 21 and the short side members 23, and the reinforcing beads 22, 24, 26 are formed respectively in the long side members 21, the short side members 23 and the beam members 25, which further increases the torsional strength.

Moreover, in the mounting frame 40 formed in a manner that the two frame straight members 41 and the two frame U-shaped members 42 are connected with each other and in the bezel 50 formed in a manner that the two bezel straight members 51 and the two bezel frame U-shaped members 52 are connected with each other, the frame straight members 41 and the frame U-shaped members 42 are connected with each other and the bezel straight members 51 and the bezel U-shaped members 52 are connected with each other by welding the respective entire regions of the respective slits between the respective end portions in the respective front face portions 40*a,* 50*a* and the respective entire regions of the respective slits between the respective end portions in the respective side face portions 40*b,* 50*b*. Hence, the torsional strength of each of the mounting frame 40 and the bezel 50 can be increased compared with the case where only the end portions in the front face portions 40*a,* 50*a* are welded, and therefore, sufficient torsional strength can be obtained in combination with the torsional strength of the back frame 20 even in a comparatively large-sized (37 inches) liquid crystal display device.

It should be noted that each angular structure in section, dimension and shape of the long side members 21, the short side members 23 and the beam members 25 of the back frame 20 are specifically set in the above embodiment, but may be set appropriately according to required conditions.

Further, the long side members 21, the short side members 23 and the beam members 25 are connected by welding in the above embodiment, but another connecting means may be employed.

Figure 10:
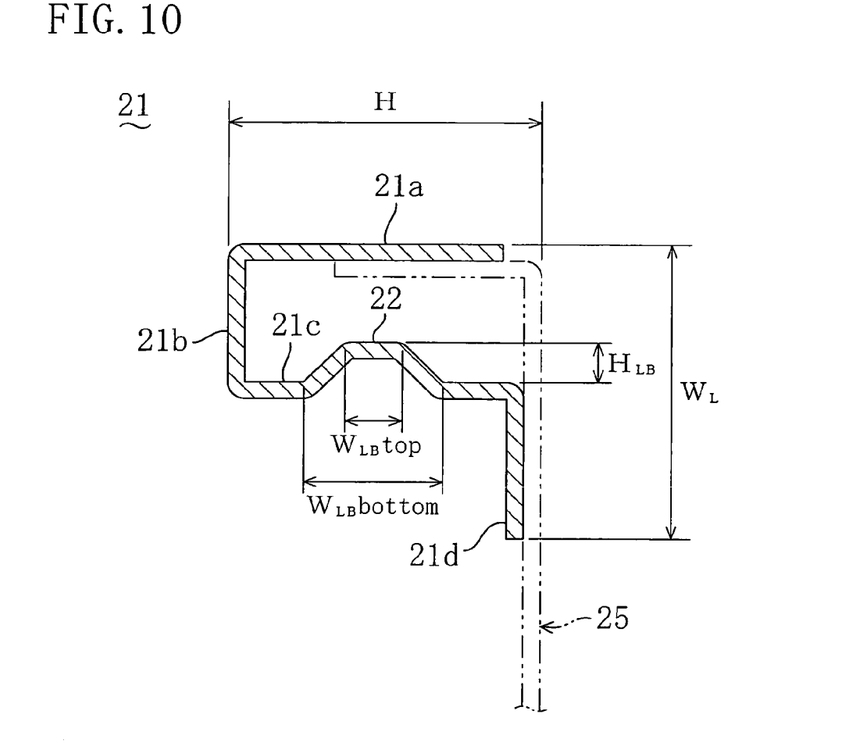
FIG. 10 is a view corresponding to FIG. 7, showing the section of the long side member of the back frame in a modified example of the present invention.

Furthermore, the reinforcing beads 22, 24, 26 are formed at the specified parts of the long side members 21, the short side members 23 and the beam members 25, respectively, in the above embodiment, but the number, part, shape and size of such reinforcing beads may be optionally set. For example, referring to the shape, the reinforcing bead 22 of each long side member 21 is formed in a shape concaved outwardly (upward in FIG. 10) of the back frame 20. Or, such reinforcing beads may not be formed in the case where the torsional strength is enough.

Moreover, the two beam members 25 are used in the above embodiment, but the number of the beam members 25 may be only one, or three or more. Contrarily, no beam member may be used in the case where sufficient torsional strength is obtained without such beam members 25.

Further, the two long side members 21, the two short side members 23 and the two beam members 25 have respectively the same shapes in the above embodiment, but may have shapes different from each other. For example, the long side member 21 on the upper side has different shape from that of the long side member 21 on the lower side in FIG. 1.

Furthermore, the materials of the long side members 21, the short side members 23 and the beam members 25 are mentioned in the above embodiment, and may be any materials only if it is capable of being welded and attaining sufficient torsional strength. Accordingly, instead of iron and aluminum alloy, mixtures and compounds made of a plurality of materials, various kinds of alloys or nonmetallic materials may be used. Further, any combination of such materials may be used optionally, appropriately.

Moreover, the back frame 20 is formed by connecting the long side members 21, the short side members 23 and the beam members 25 one another, which are separate members, in the above embodiment, but the long side portions, the short side portions and the beam portions may be integrally formed into a single piece of member.

Further, in the above embodiment, the mounting frame 40 and the bezel 50 are in L shapes in section but the respective sections may be designed optionally according to needs.

Furthermore, the mounting frame 40 is divided in the two frame straight members 41 and the two frame U-shaped members 42 and the bezel 50 is divided in the two bezel straight members 51 and the two bezel U-shaped members 52 in the above embodiment, but the number of division and the shape of the divisional members can be set optionally.

Moreover, the entire regions in the widthwise direction of the short side are welded between the frame straight members 41 and the frame U-shaped members 42 in the outer face of the side face portion 40b of the mounting frame 40 and between the bezel straight members 51 and the bezel U-shaped members 52 in the outer face of the side face portion 50b of the bezel 50 in the above embodiment, but only part of the regions may be welded.

Further, the plural divisional members (the frame straight members 41, the frame U-shaped members 42, the bezel straight members 51 and the bezel U-shaped members 52) are connected with each other to form the mounting frame 40 and the bezel 50, respectively, in the above embodiment, but either one of the mounting frame 40 and the bezel 50 may be composed of plural divisional members connected with each other.

Furthermore, the respective materials of the mounting frame 40 and the bezel 50 are mentioned in the above embodiment, and material may be selected, as well as in the case of the back frame 20, according to required condition appropriately.

In addition, a liquid crystal display device is described as an example in the above embodiment, but the present invention is not limited thereto and is applicable to, for example, general flat display devices, such as plasma display devices.

What is claimed is:

1. A display device comprising:
a substantially rectangular shaped display panel that displays visual information, the display panel having a length extending in a long side direction and a width extending in a short side direction; and
a substantially rectangular shaped back frame arranged at a back of the display panel and supporting the display panel,
wherein the back frame includes:
a pair of long side portions each of which extends in the long side direction, is arranged along the short side direction and has an angular structure in section and is composed of an outer face portion, an upper face portion, an inner face portion and a bottom face portion in which three parts between the outer face portion and the upper face portion, between the upper face portion and the inner face portion, and between the inner face portion and the bottom face portion are bent at right angles;
a pair of short side portions which extend respectively in the short side direction at end sides in the long side direction of the long side portions between the pair of long side portions, of which respective end portions are connected with the respective end portions of the long side portions, and each of which has an angular structure in section and is composed of an outer face portion, a bottom face portion, a protruding portion and a flange portion in which three parts between the outer face portion and the bottom face portion, between the bottom face portion and the protruding portion and between the protruding portion and the flange portion are bent at right angles.

2. The display device of claim 1, wherein
each of the long side portions is formed substantially in a U shape in section.

3. The display device of claim 1, wherein
a reinforcing bead extending in the long side direction is formed in each of the long side portions.

4. The display device of claim 1, wherein
a reinforcing bead extending in the short side direction is formed in each of the short side portions.

5. The display device of claim 1, wherein
the long side portions and the short side portions are composed of long side members and short side members, respectively, which are separate members from each other, and
the back frame is formed by connecting the long side members and the short side members with each other.

6. The display device of claim 1, wherein
said three parts are bent at substantially right angles.

7. A display device of comprising:
a substantially rectangular shaped display panel that displays visual information, the display panel having a length extending in a long side direction and a width extending in a short side direction; and
a substantially rectangular shaped back frame arranged at a back of the display panel and supporting the display panel, wherein
the back frame includes:
a pair of long side portions each of which extends in the long side direction, is arranged along the short side direction and has an angular structure in section and is composed of an outer face portion, an upper face portion, an inner face portion and a bottom face portion in which three parts between the outer face portion and the upper face portion, between the upper face portion and the inner face portion, and between the inner face portion and the bottom face portion are bent at right angles;
a pair of short side portions which extend respectively in the short side direction at end sides in the long side direction of the long side portions between the pair of long side portions, of which respective end portions are connected with the respective end portions of the long side portions, and each of which has an angular structure in section and is composed of an outer face portion, a bottom portion, a protruding portion and a flange portion in which three parts between the outer face portion and the bottom face portion, between the bottom face portion and the protruding portion and between the protruding portion and the flange portion are bent at right angles; and at least one beam portion which is arranged so as to extend in the short side direction between the pair of short portions, of which end portions are connected with the pair of long side portions, respectively, and which has an angular structure in section and is composed of a bottom face portion, a protruding portion and a flange portion in which two parts in section between the bottom face portion and the protruding portion and between the protruding portion and the flange portion are bent at right angles.

8. The display device of claim 7, wherein
a reinforcing bead extending in the short side direction is formed in the beam portion.

9. The display device of claim 8, wherein
the long side portions, the short side portions and the beam portion are composed of long side members, short side members and a beam member, respectively, which are separate members from each other, and
the back frame is formed by connecting the long side members, the short side members and the beam member with one another.

10. A display device comprising:
a substantially rectangular shaped display panel that displays visual information, the display panel having a length extending in a long side direction and a width extending in a short side direction; and
a substantially rectangular shaped back frame arranged at a back of the display panel and supporting the display panel,
wherein the back frame includes:
a pair of long side members each of which extends in the long side direction, is arranged along the short side direction and has an angular structure in section and is composed of an outer face portion, an upper face portion, an inner face portion and a bottom face portion in which three parts between the outer face portion and the upper face portion, between the upper face portion and the inner face portion, and between the inner face portion and the bottom face portion are bent at right angles;
a pair of short side members which extend respectively in the short side direction at end sides in the long side direction of the long side members between the pair of long side members, of which respective end portions are connected by welding with the respective end portions of the long side members, and each of which has an angular structure in section and is composed of an outer face portion, a bottom face portion, a protruding portion and a flange portion in which three parts between the outer face portion and the bottom face portion, between the bottom face portion and the protruding portion and between the protruding portion and the flange portion are bent at right angles.

11. A liquid crystal display device comprising a display device according to any one of claims 1,2,3,4,5,7,8,9, and 10,
wherein the display panel serves as a liquid crystal display panel including a pair of transparent substrates and a liquid crystal layer interposed between the pair of transparent substrates, and
a backlight section that emits light to the liquid crystal panel is provided between the liquid crystal display and the back frame.

12. The display device of claim 1 or 10, wherein
at least one frame is provided which includes a front face portion arranged at a peripheral portion of the display panel so as to overlap the peripheral portion along the entire length and width of the display panel, and a side face portion extending from an outer periphery of the front face portion toward the back frame and which is arranged along the peripheral portion of the display lay panel,
the at least one frame is formed by connecting a plurality of divisional members divided in a direction along the peripheral portion of the display panel, and
the plurality of divisional members are connected between respective end portions of the plurality of divisional members in the front face portion and between respective end portions of the plurality of divisional members in the side face portion.

13. The display device of claim 12, wherein
the connection is performed by welding.

14. The display device of claim 12, wherein
the at least one frame serves as a rear frame of which the front face portion is located on the back frame side of the peripheral portion of the display panel.

15. The display device of claim 12, wherein
the at least one frame serves as a front frame of which the front face portion is located on a side opposite the back frame side of the peripheral portion of the display panel.

16. The display device of claim 12, wherein
the number of the at least one frame is two,
one of the two frames serves as a rear frame of which the front face portion is located on the back frame side of the peripheral portion of the display panel, and
the other frame serves as a front frame of which the front face portion is located on a side opposite the back frame side of the peripheral portion of the display panel.

17. The display device of claim 10, wherein
said three parts are bent at substantially right angles.

* * * * *